United States Patent [19]

Kazino et al.

[11] Patent Number: 4,525,912
[45] Date of Patent: Jul. 2, 1985

[54] PIERCE NUT AND A BACK-UP DIE USED IN COMBINATION THEREWITH

[75] Inventors: Hiroshi Kazino, Komaki; Hiroshi Isomura, Kounan; Kozo Mizuno, Aichi, all of Japan

[73] Assignee: Kabushiki Kaisha Aoyama Seisakusho, Nagoya, Japan

[21] Appl. No.: 492,674

[22] Filed: May 9, 1983

[51] Int. Cl.$^3$ .............................................. B23P 11/00
[52] U.S. Cl. ................................ 29/243.52; 29/432.1; 29/512
[58] Field of Search .................. 29/243.5, 243.52, 432, 29/432.1, 432.2, 512, 523; 411/176, 177, 179, 411/180, 181

[56] References Cited

U.S. PATENT DOCUMENTS 3,920,059  11/1975  Grube .
3,938,239   2/1976  Lauth .............................. 29/243.52

FOREIGN PATENT DOCUMENTS 971087   7/1975  Canada .............................. 411/177
938490  10/1963  United Kingdom ................ 411/179

Primary Examiner—James L. Jones, Jr.
Attorney, Agent, or Firm—Birch, Stewart, Kolasch & Birch

[57]  ABSTRACT

A pierce nut has a plurality of projections which are integrally formed with a cylindrical body of the pierce nut. When the pierce nut is pressed against a metal sheet laid on a back-up die, an opening is formed in the metal sheet only by shearing force between the pierce nut and the back-up die, with no other force being used to press-break the metal sheet, and the projections are deformed by an annular bank portion of the back-up die at different portions thereof each time the back-up die is used. Thus, the use of the present pierce nut in combination with the present back-up die remarkably extends the life of the back-up die.

3 Claims, 8 Drawing Figures

PIERCE NUT AND A BACK-UP DIE USED IN COMBINATION THEREWITH

BACKGROUND OF THE INVENTION

This invention relates to a pierce nut and a back-up die used for securing the pierce nut to a metal sheet.

The pierce nut is known as a self-clinching pierce type fastener which is used as a punch to form an opening in a metal sheet through which the pierce nut is secured. When the pierce nut is secured to the metal sheet, it is used in combination with a back-up die.

Heretofore, several types of the pierce nuts and back-up dies have been developed as shown, for example, in U.S. Pat. No. 3,920,059. The fatal disadvantage of the pierce nut and back-up die combination of the prior art is that the life of the back-up die is very short. One of the reasons why the life of the back-up die of the prior art is very short is that the back-up die is subjected to heavy pressing force during the piercing operation of the nut, since press-breaking force is required for forming a full opening in the metal sheet for passage of the pierce nut. Another reason is that the load-bearing portions in the back-up die are always the same portions and therefore these portions are liable to be easily broken by heavy pressing force.

These reasons why the life of the prior art back-up die is very short will be further clearly explained with reference to FIGS. 1 and 2. FIGS. 1 and 2 show a pierce nut 1 and a back-up die 2 of the prior art which are used in combination with each other. The pierce nut 1 comprises a cylindrical body 3 and a radially extending flange 4 integrally formed with the cylindrical body 3. The cylindrical body has a center bore 5 in which a device such as a screw, bolt or pin is usually secured. It should be noted that no projections are formed on the outer peripheral surface of the cylindrical body 3 (FIG. 1). Instead, laterally inwardly extending projections 6 are formed in the back-up die (FIG. 2). A semi-spherical depression 7 is formed on the top of each projection 6.

When the pierce nut is punched into a metal sheet (not shown) laid on the back-up die 2, the cylindrical body 3 is inserted into a bore 9 of the back-up die 2 and the metal sheet is sheared between a bottom peripheral edge 8 of the pierce nut 1 and top peripheral edges 10 of the back-up die 2. However, the metal sheet is not sheared in portions at which the depressions 7 exist. Thus, these portions of the metal sheet have to be press-broken between a bottom surface 11 of the pierce nut 1 and the circular edges 12 of the depressions 7. Accordingly, the back-up die 2 of the prior art is subjected to heavy press-breaking force always at the same portions (circular edges 12) each time the back-up die is used and therefore, the circular edges 12 tend to be worn or sometimes even broken.

SUMMARY AND OBJECTS OF THE INVENTION

It is accordingly an object of the present invention to provide an improved pierce nut and a back-up die used in combination with the pierce nut, which eliminate the disadvantages of the prior art.

According to the present combination of pierce nut and back-up die, the opening in the metal sheet is formed only by shearing force and no pressing force is required for press-breaking the metal sheet. The pressing force acting on the back-up die of the present invention is only for deformation of minor portions of the pierce nut and the metal sheet, which is much smaller than the pressing force required for press-breaking the metal sheet. Thus, the compressive stress exerted on the back-up die of the present invention is very small compared with that exerted on the prior art back-up die.

Furthermore, according to the present invention, no one particular portion is provided in the back-up die for receiving the pressing force from the pierce nut and therefore, the pressing force from the pierce nut is adapted to be received at different portions each time the back-up die is used.

The object of the present invention is achieved by providing on a cylindrical body of the pierce nut a plurality of radially extending projections which axially extend from the under surface of a flange to a position short of the bottom edge of the cylindrical body, these projections being equally spaced from one another around the cylindrical body, and by providing on a top portion of a back-up die an annular groove having a special configuration in its vertical cross-section.

BRIEF DESCRIPTION OF THE DRAWINGS

The various features, objects and advantages of the present invention will become apparent on consideration of the following detailed explanation of the present invention with reference to the attached drawings.

DETAILED DESCRIPTION OF THE DRAWINGS

FIGS. 3 and 4 and FIGS. 5 and 6 show respectively a pierce nut 20 and a back-up die 50 of the present invention.

Figure 1:
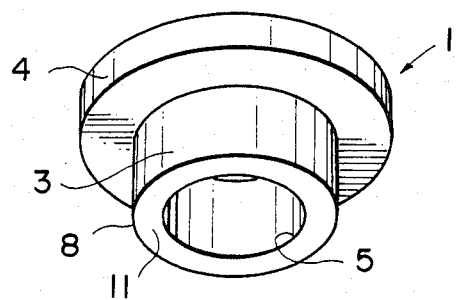
FIG. 1 is a perspective view of a pierce nut of the prior art.
Figure 2:
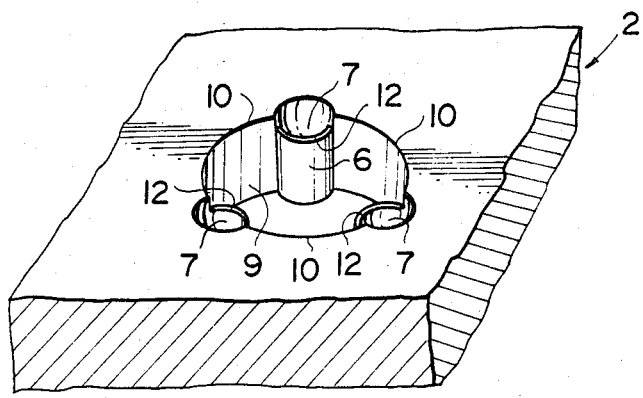
FIG. 2 is a perspective view of a back-up die of the prior art used in combination with the pierce nut of FIG. 1.
Figure 3:
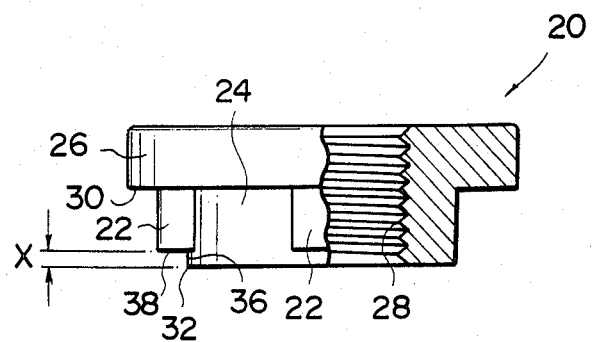
FIG. 3 is a side elevational view partially in cross-section of a pierce nut of the present invention.
Figure 4:
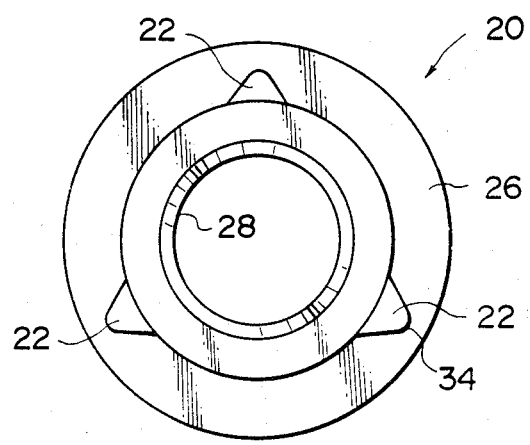
FIG. 4 is a bottom plan view of the pierce nut of FIG. 3.
Figure 5:
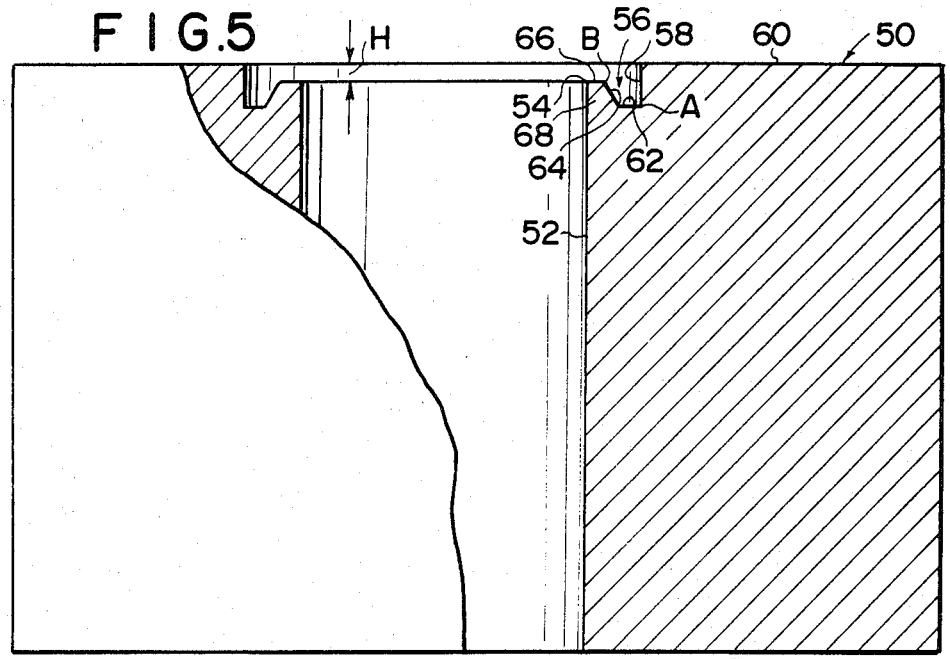
FIG. 5 is a side elevational view partially in cross-section of a back-up die of the present invention which is used in combination with the pierce nut of FIGS. 3 and 4.
Figure 6:
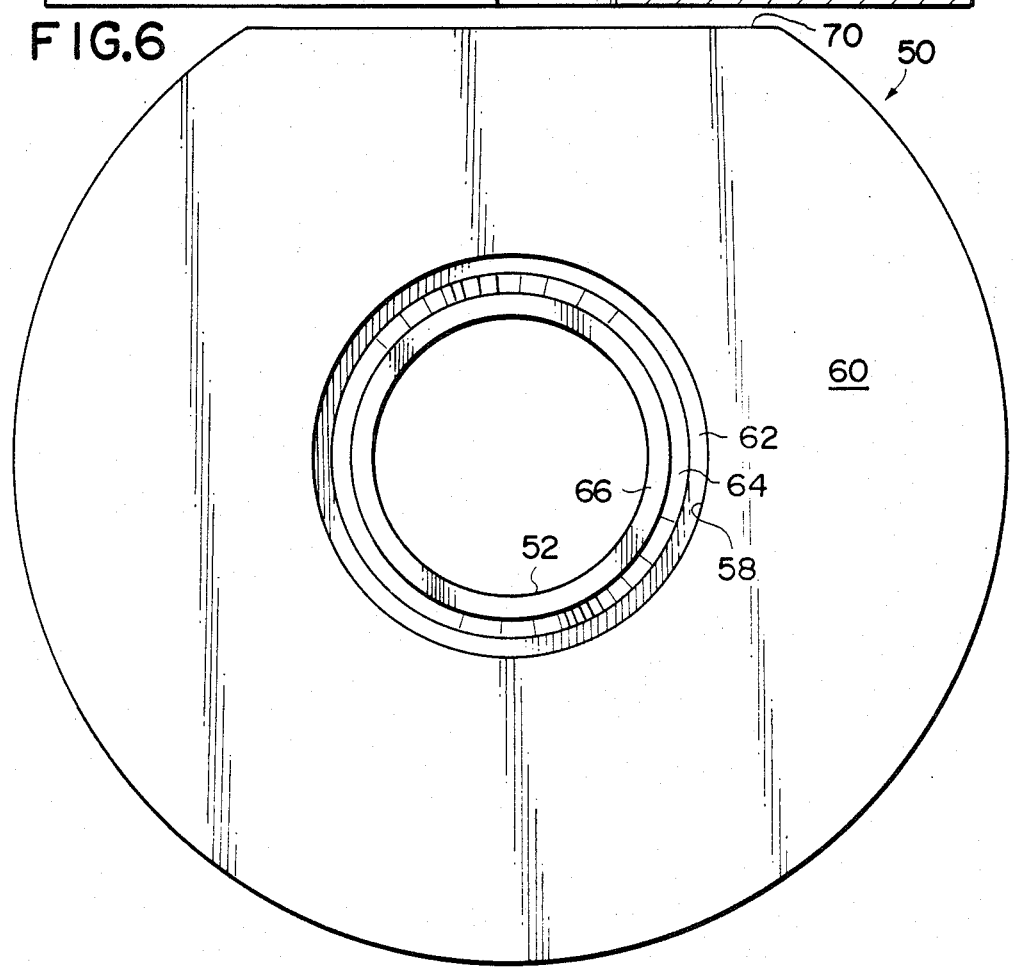
FIG. 6 is a top plan view of the back-up die of FIG. 5.

The most characteristic feature of the present pierce nut 20 is that a plurality of radially extending projections 22 are provided on the outer peripheral surface of a cylindrical body 24 (FIGS. 3 and 4). On the contrary, no projections similar to projections 6 of the prior art are provided on the back-up die 50 of the present invention (FIGS. 5 and 6). A laterally extending flange 26 and a center bore 28 of the pierce nut 20 have the same functions as those of the prior art shown in FIGS. 1 and 2.

In the embodiment of FIGS. 3 and 4, three projections 22 are integrally formed with the cylindrical body 24 on the periphery thereof. These projections 22 should be equidistantly spaced so as to cause a uniform deformation of each projection 22. The number of the projections 22 can be properly determined as required for the application. Each of the projections 22 extends in parallel with the axis of the cylindrical body 24 from the under surface 30 of the flange 26 to a position spaced a distance "X" from the bottom edge 32 of the cylindrical body 24. The distance "X" is properly determined in accordance with the thickness of the metal sheet to which the pierce nut 20 is secured. As clearly shown in FIG. 4, the lateral cross-sectional configuration of each projection 22 is substantially triangular. However, other configurations, for example a semicircular configuration, may be adopted. The end portion 36 (FIG. 3) of the cylindrical body 24, which is situated below the projections 22, forms a pilot portion initially entering into a center bore 52 (FIGS. 5 and 6) of the back-up die 50 during the securing operation of the pierce nut 20, which operation will be hereinafter described in detail.

Figure 7:
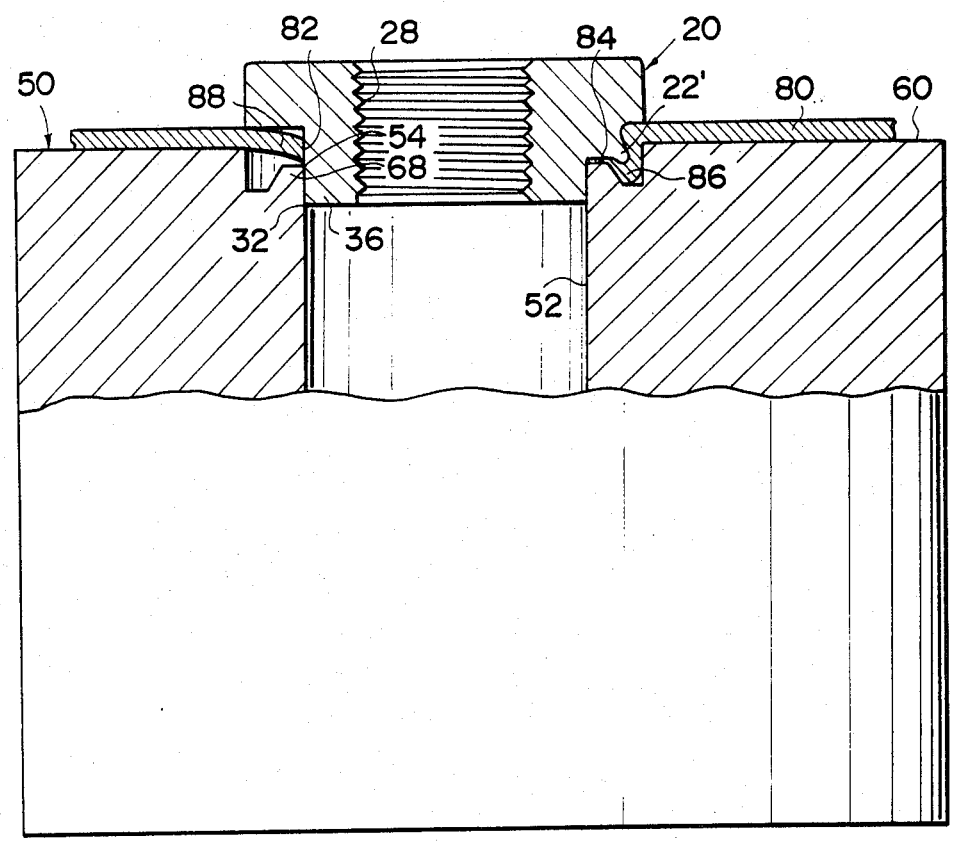
FIG. 7 is a cross-sectional view illustrating an interlocked condition between the pierce nut of the present invention and the metal sheet just after the pierce nut has completely punched into the back-up die.

The back-up die 50 of the present invention shown in FIGS. 5 and 6 is used in combination with the pierce nut 20 shown in FIGS. 3 and 4. The back-up die 50 has a center bore 52 into which the pilot portion 36 of the pierce nut 20 is inserted during the securing operation of the pierce nut 20 to the metal sheet 80 (FIG. 7). The diameter of the center bore 52 is so selected that it is slightly larger than that of the pilot portion 36 of the pierce nut 20 and the top edge 54 of the center bore 52 and the bottom edge 32 of the pilot portion 36 co-act with each other as shearing edges for shearing the metal sheet 80 interposed therebetween.

As clearly shown in FIGS. 5 and 6, an annular groove 56 is formed co-axially with the center bore 52 on the top of the back-up die 50 to define an annular bank portion 68 between the center bore 52 and the annular groove 56. The annular groove 56 is clearly defined by the vertical cross-sectional configuration thereof shown in FIG. 5. Firstly, an upstanding wall 58 forms one portion of the annular groove 56. It extends substantially vertically from the top surface 60 of the back-up die 50 to a position "A" which is situated lower than the top edge 54 of the center bore 52. It is preferable to make the diameter of the upstanding wall 58 slightly smaller than the external diameter of the flange 26 of the pierce nut 20 in order to prevent reduction of the strength of the metal sheet 80 caught between the flange 26 and the top surface 60 of the back-up die 50 during the punching operation shown in FIG. 7. Then, following the upstanding wall 58, a bottom wall 62 extends radially inwardly from said position "A". Further, following the bottom wall 62, an inclined wall 64 extends inwardly and upwardly from said bottom wall 62 to a position "B" which is positioned substantially at the same height as the top edge 54 of center bore 52. Finally, following the inclined wall 64, a top wall 66 extends radially inwardly.

The level of the top wall 66 is substantially identical to the level of the position "B" and the top edge 54 of the center bore 52 and it is lower by a height "H" from the top surface 60 of the back-up die 50. The height "H" will be properly determined in accordance with the material and the thickness of the metal sheet 80. A cut-off surface 70 (FIG. 6) functions as a positioning surface when the back-up die 50 is mounted on the table of a press machine used for securing the pierce nut 20 to the metal sheet 80.

The operations for securing the pierce nut 20 of the present invention to the metal sheet 80 are carried out similarly to the conventional manner by using a press machine.

When the pierce nut 20 is advanced downwardly toward the metal sheet 80 laid on the back-up die 50 mounted on the press machine table, the bottom edge 32 of the pilot portion 36 of the pierce nut 20 presses the metal sheet 80 downwardly and therefore, the metal sheet 80 is sheared by the edge 32 of the pierce nut 20 and the edge 54 of the back-up die 50. Thus, according to the present invention, the metal sheet 80 is easily punched out and an opening 82 is easily formed with relatively small pressing force. The compressive stress exerted on the annular bank portion 68 is less than the compressive stress exerted on the circular edge 12 of the prior-art back-up die 2 shown in FIG. 2, since no press-breaking force is required according to the present invention for forming an opening 82 in the metal sheet 80. This is one reason why the back-up die 50 of the present invention has a longer service life.

By further advancing the pierce nut 20 toward the back-up die 50, the bottom surface 38 (FIG. 3) of each projection 22 abuts with the top surface 66 of the annular bank portion 68 of the back-up die 50 with the metal sheet 80 therebetween. Thus, the metal sheet 80 caught between the projections 22 and the annular bank portion 68 is deformed and made thin as designated by numeral 84 in FIG. 7. During this process, each projection 22 is displaced laterally outwardly as designated by numeral 22' in FIG. 7. The metal sheet 80 adjacent to each projection 22 is also deformed laterally and downwardly in the annular groove 56 of the back-up die 50 as designated by numeral 86. Thus, an interlock or clinch is formed between each projection 22 of the pierce nut 20 and the metal sheet 80 and therefore, the pierce nut 20 is rigidly and non-rotatably secured to the metal sheet 80. When the projections 22 are deformed, the annular bank portion 68 of the back-up die 50 of the present invention is pressed with relatively large pressing force by the projections 22, similarly to the conventional die of the prior art. However, according to the present invention, since the back-up die 50 of the present invention is not provided with any particular portions which are similar to the circular edges 12 of the depressions 7 of the prior art, the pressing force from the projections 22 of the pierce nut 20 is received by the annular bank portion 68 at different portions thereof each time the back-up die is used. Thus, fatigue failure and wear of the back-up die 50 of the present invention are greatly reduced as compared with the back-up die of the prior art. This is another reason why the life of the back-up die 50 of the present invention is longer.

Figure 8:
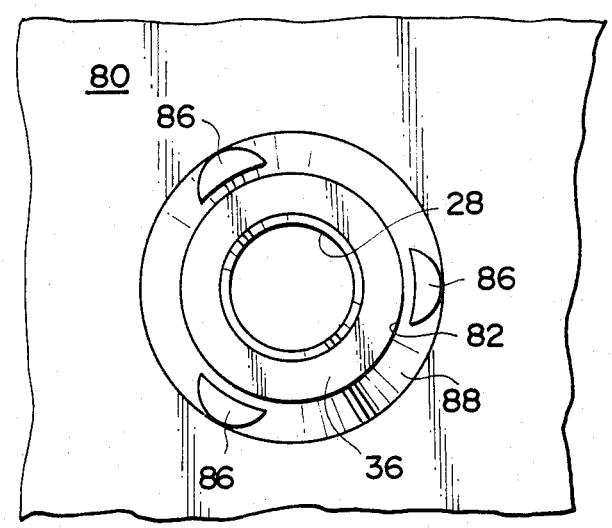
FIG. 8 is a bottom plan view of the interlocked condition of the pierce nut of the present invention and the metal sheet.

FIG. 8 is a bottom plan view of the pierce nut 20 and the metal sheet 80 showing the condition in which the pierce nut 20 is secured to the metal sheet 80 after the back-up die 50 has been removed therefrom. In FIG. 8, the portion designated by numeral "88" is a frusto-conically deformed portion as shown in FIG. 7 by the same numeral 88. In the regions where the projections 22 of the pierce nut are not present, the metal sheet 80 is deformed into a frusto-conical shape around the cylindrical portion 24 of the pierce nut 20.

It should be understood that the present invention is not limited in its scope of the structure hereinabove described and other modifications and variations of the illustrated embodiment will readily suggest themselves to those skilled in the art.

What is claimed is:

1. A combination of a pierce nut to be secured to a metal sheet and a back-up die for securing the nut to a metal sheet comprising a cylindrical body and a laterally extending flange integrally formed with the cylindrical body, characterized in that:
   a plurality of projections are integrally formed with said cylindrical body on an outer surface thereof;
   each of said projections axially extending from an under surface of the flange to a position short of a bottom edge of the cylindrical body;
   said back-up die having a center bore formed in the die body and having a slightly larger diameter than that of a pilot portion of the cylindrical body of the pierce nut;
   an annular groove being formed coaxially with the center bore on the top of the back-up die;
   an annular bank portion to deform the projections of the pierce nut being formed between the center bore and the annular groove;
   a vertical cross-sectional configuration of the annular groove being defined by an upstanding wall substantially vertically extending from the top surface of the back-up die to a position situated lower than the top edge of said center bore;
   a bottom wall radially inwardly extending from said position at which said upstanding wall ends;
   an inclined wall inwardly and upwardly extending from said bottom wall to a position which is substantially the same height as the top edge of said center bore; and
   a radially inwardly extending top wall connecting said inclined wall and the top edge of said center bore and being positioned lower than the top surface of the back-up die.

2. A combination of a pierce nut to be secured to a metal sheet and a back-up die for securing the nut to a metal sheet comprising a cylindrical body, a laterally extending flange integrally formed with the cylindrical body and a plurality of projections integrally formed with the cylindrical body on the outer surface thereof characterized in that:
   each projection axially extends from an under surface of the flange to a position short of a bottom edge of the cylindrical body and therefore a pilot portion is formed in the cylindrical body below the projections, the pilot portion initially entering into the back-up die during the securing operation of the pierce nut;
   each projection having a height from the outer surface of the cylindrical body being constant along entire length of the projection;
   the bottom edge of the pilot portion of the cylindrical body serves as a shearing edge to punch out an opening in the metal sheet in co-operation with the back-up die;
   lateral and outward deformation is caused only in projections during the securing operation of the pierce nut to bite the metal sheet between the projections and the laterally extending flange while no deformation is caused in the pilot portion of the cylindrical body during the securing operation of the pierce nut;
   said back-up die having a center bore formed in the die body and having a slightly larger diameter than that of a pilot portion of the cylindrical body of the pierce nut, the peripheral edge of the center bore serves as a shearing edge for punching out an opening in the metal sheet in co-operation with the bottom edge of the cylindrical body of the pierce nut;
   an annular bank portion is formed directly adjacent to the center bore and serves for pressing the bottom surface of projections of the pierce nut and for laterally and outwardly deforming the projection; and
   an annular groove is formed directly adjacent to the annular bank portion and serves for permitting the lateral and outward deformation of the projections of the pierce nut and the metal sheet therein as well as for limiting the excessive lateral and outward deformation of the nut and metal sheet.

3. A combination of a pierce nut to be secured to a metal sheet and a back-up die for securing the nut to a metal sheet comprising a cylindrical body, a laterally extending flange integrally formed with the cylindrical body and a plurality of projections integrally formed with the cylindrical body on the outer surface thereof characterized in that:
   each projection axially extends from an under surface of the flange to a position short of a bottom edge of the cylindrical body and therefore a pilot portion is formed in the cylindrical body below the projections, the pilot portion initially entering into the back-up die during the securing operation of the pierce nut;
   each projection having a height from the outer surface of the cylindrical body being constant along entire length of the projection;
   the bottom edge of the pilot portion of the cylindrical body serves as a shearing edge to punch out an opening in the metal sheet in co-operation with the back-up die;
   lateral and outward deformation is caused only in projections during the securing operation of the pierce nut to bite the metal sheet between the projections and the laterally extending flange while no deformation is caused in the pilot portion of the cylindrical body during the securing operation of the pierce nut;
   said back-up die having a center bore formed in the die body and having a slightly larger diameter than that of a pilot portion of the cylindrical body of the pierce nut, the peripheral edge of the center bore serves as a shearing edge for punching out an opening in the metal sheet in co-operation with the bottom edge of the cylindrical body of the pierce nut;
   an annular bank portion is formed directly adjacent to the center bore and serves for pressing the bottom surface of projections of the pierce nut and for laterally and outwardly deforming the projection; and
   an annular groove is formed directly adjacent to the annular bank portion and serves for permitting the lateral and outward deformation of the projections of the pierce nut and the metal sheet therein as well as for limiting the excessive lateral and outward deformation of the nut and metal sheet;
   said annular groove including a vertical cross-sectional configuration defined by an upstanding wall substantially vertically extending from the top surface of the back-up die to a position situated lower than the top edge of said center bore, a bottom wall radially inwardly extending from said position at which said upstanding wall ends, an inclined wall inwardly and upwardly extending from said bottom wall to a position which is substantially the same height as the top edge of said center bore, and a radially inwardly extending top wall connecting said inclined wall and the top edge of said center bore and being positioned lower than the top surface of the back-up die.

* * * * *